(12) United States Patent
Watanabe et al.

(10) Patent No.: US 6,203,461 B1
(45) Date of Patent: Mar. 20, 2001

(54) HYDRAULIC TENSIONER

(75) Inventors: Sumio Watanabe, Kawagoe; Shigekazu Fukuda, Tokorozawa, both of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/321,001

(22) Filed: May 27, 1999

(30) Foreign Application Priority Data

May 27, 1998 (JP) .................................................. 10-146307

(51) Int. Cl.$^7$ ....................................................... F16H 7/08
(52) U.S. Cl. .............................................................. 474/110
(58) Field of Search ..................................... 474/110, 109, 474/111, 135, 138, 139, 136, 101, 133, 117; 137/251, 624.13, 50

(56) References Cited

U.S. PATENT DOCUMENTS

| 4,881,927 | | 11/1989 | Suzuki . | |
| 5,181,889 | * | 1/1993 | Maruyama et al. | 474/110 |
| 5,366,415 | * | 11/1994 | Church et al. | 474/110 |
| 5,653,651 | * | 8/1997 | Kawashima et al. | 474/110 |
| 5,713,809 | * | 2/1998 | Yamamoto et al. | 474/110 |
| 5,785,619 | * | 7/1998 | Nakakubo et al. | 474/110 X |
| 5,908,363 | | 6/1999 | Suzuki . | |
| 5,913,742 | * | 6/1999 | Nakamura et al. | 474/110 |

FOREIGN PATENT DOCUMENTS

| 0 110 061 | 6/1984 | (EP) . |
| 0 459 798 | 12/1991 | (EP) . |
| 0 834 678 | 4/1998 | (EP) . |
| 91/12450 | 8/1991 | (WO) . |

* cited by examiner

Primary Examiner—David A. Bucci
Assistant Examiner—Marcus Charles
(74) Attorney, Agent, or Firm—Dann, Dorfman, Herrell and Skillman; Henry H. Skillman

(57) ABSTRACT

A hydraulic tensioner includes a ball check valve disposed inside a tensioner body for permitting the flow of oil only in one direction from an oil passage connected to an oil source toward and a high-pressure chamber formed behind a plunger within a plunger receiving hole in the tensioner body. The ball check valve includes a valve seat on which a check ball rests when closed. The valve seat has a tapered seating surface outwardly diverging at an angle of 60°–110°, and the check ball has a mass of 0.1 g or less. The check ball enables following up oil pressure variations of high frequencies, and even in a region wherein the load acting on the plunger varies at high frequencies it is possible to ensure a sufficient backstop force without increasing the oil pressure supplied.

3 Claims, 5 Drawing Sheets

HYDRAULIC TENSIONER

BACKGROUND OF THE INVENTION

1. Field of the Invention:

The present invention relates to a hydraulic tensioner for imparting an appropriate tension to, for example, a timing belt or chain in a vehicular engine.

2. Description of the Related Art:

For a timing belt or chain which transmits rotation between a crank shaft and a cam shaft in an engine, a hydraulic tensioner is in wide use for suppressing vibrations generated from the timing belt or chain during vehicular running and for maintaining an appropriate tension.

FIG. 5 shows a chain drive in an engine for which a conventional hydraulic tensioner is used. In this figure, a hydraulic tensioner A1 is attached to an engine body on a slack side of a chain A6. The chain A6 is entrained on both a driving sprocket A3 which is rotated by a crank shaft A2 of the engine and a driven sprocket A5 which is fixed onto a cam shaft A4.

In the hydraulic tensioner A1, a plunger A8 projects retractably from the front side of a tensioner body A7. The plunger A8 pushes the back side of a tensioner lever A10 at a position near a free end of the same lever. The tensioner lever A10 is pivotally connected to the engine body through a pivot shaft A9, so that a shoe surface A11 of the tensioner lever A10 comes into sliding contact with the slack side of the chain A6 and thereby imparts a tension to the chain.

In the interior of the tensioner body A7, as shown in FIG. 6, there is formed a plunger receiving hole A12 into which is inserted the plunger A8 in a protrudable and retractable manner. A ball check valve A13 is provided at the bottom of the hole A12.

The plunger A8 has a hollow portion A14 which is open at its end face opposed to the ball check valve A13. A plunger spring A15 is disposed in both the hollow portion A14 and the plunger receiving hole A12. Thus, the plunger spring A15 acts between the tensioner body A7 and the plunger A8 to urge the plunger A8 at all times so that a front end portion of the plunger projects to the exterior of the tensioner body A7.

A high-pressure chamber H is formed by a space which is defined by both the plunger receiving hole A12 and the hollow portion A14 of the plunger A8. The interior of the high-pressure chamber H is always filled with oil which is fed from an oil supply source (not shown) through an oil passage A16 and a ball check valve A13.

In the hydraulic tensioner A1 constructed as above, when an impact force is exerted on the plunger A8 from the chain A6 side through the tensioner lever A10 shown in FIG. 5, the internal oil pressure of the high-pressure chamber H rises and the a check ball A17 in the ball check valve A13 blocks an opening of the oil passage A16 which extends through a ball seat A18, thereby preventing a reverse flow of oil to the oil supply source side.

As a result, the internal pressure of the high-pressure chamber H further increases and leaks to the exterior of the tensioner body A7 through a slight gap formed between the outer peripheral surface of the plunger A8 and the inner peripheral surface of the plunger receiving hole A12. At this time, the impact force acting on the plunger A8 is buffered by the resulting flow resistance of oil.

According to a standard construction of the conventional hydraulic tensioner A1 referred to above, a seating surface A19 of the ball seat in the ball check valve A13 in which the oil passage A16 opens as in FIG. 7 is formed as an outwardly expanded tapered surface having a divergent angle of about 90°, and the inside diameter of the oil passage A16 is 2.5 mm, while the outside diameter of the check ball A17 is 3.97 mm.

The check ball A17 having the above outside diameter is made of steel and has a mass of about 0.26 g. When the pressure of oil supplied through the oil passage A16 to the high-pressure chamber H side in FIG. 6 is low and when a load imposed on the plunger A8 from the chain side pulsates with a cycle exceeding 100 Hz, the check ball A17 can no longer follow up the variation in the load due to its inertia, with consequent leakage of oil from the high-pressure chamber H side to the oil passage A16, thus causing the backstop force of the plunger A8 to be deteriorated markedly and intensifying the vibration of the chain.

On the other hand, if the pressure of the oil fed to the high-pressure chamber H is increased, it will become possible to suppress the vibration of the chain during vehicular running, but because of an increase in the tension acting on the chain a beat noise is apt to occur between the driving sprocket and the driven sprocket. For this reason it has so far been difficult to satisfy the performance required from the engine side.

SUMMARY OF THE INVENTION

Accordingly, it is an object of the present invention to solve the above-mentioned problems of the prior art and provide a hydraulic tensioner capable of affording a sufficient backstop force without increasing the supplied oil pressure even in the event the load acting on the plunger varies at a high frequency.

To attain the foregoing object, a hydraulic tensioner of the present invention includes a tensioner body having a plunger receiving hole, and a plunger slidably fitted in the plunger receiving hole and urged by a spring so that one end of the plunger projects outwards from the plunger receiving hole, the plunger defining within the plunger receiving hole a high-pressure chamber. The tensioner further includes a ball check valve having an oil passage allowing oil to be introduced into the high-pressure chamber, and a check ball disposed between the oil passage and the high-pressure chamber to permit only the flow of oil in a direction from the oil passage toward the high-pressure chamber. The ball check valve further has a valve seat on which the check ball rests when closed. The oil passage extending through the valve seat. The valve seat has an outwardly diverging tapered surface having a divergent angle of 60° to 110°. The check ball has a mass of 0.1 g or less.

With this construction, the check ball is superior in its performance of following up oil pressure variations of high frequencies, and even in a region wherein the load acting on the plunger varies at high frequencies it is possible to ensure a sufficient backstop force without increasing the oil pressure supplied.

The above and other object and advantages of the present invention will become apparent from the following detailed description of the preferred embodiment when read in conjunction with the accompanying drawings.

DETAILED DESCRIPTION OF THE PREFERRED EMBODIMENT

An embodiment of the present invention will be described herein under with reference to the drawings.

Figure 1:
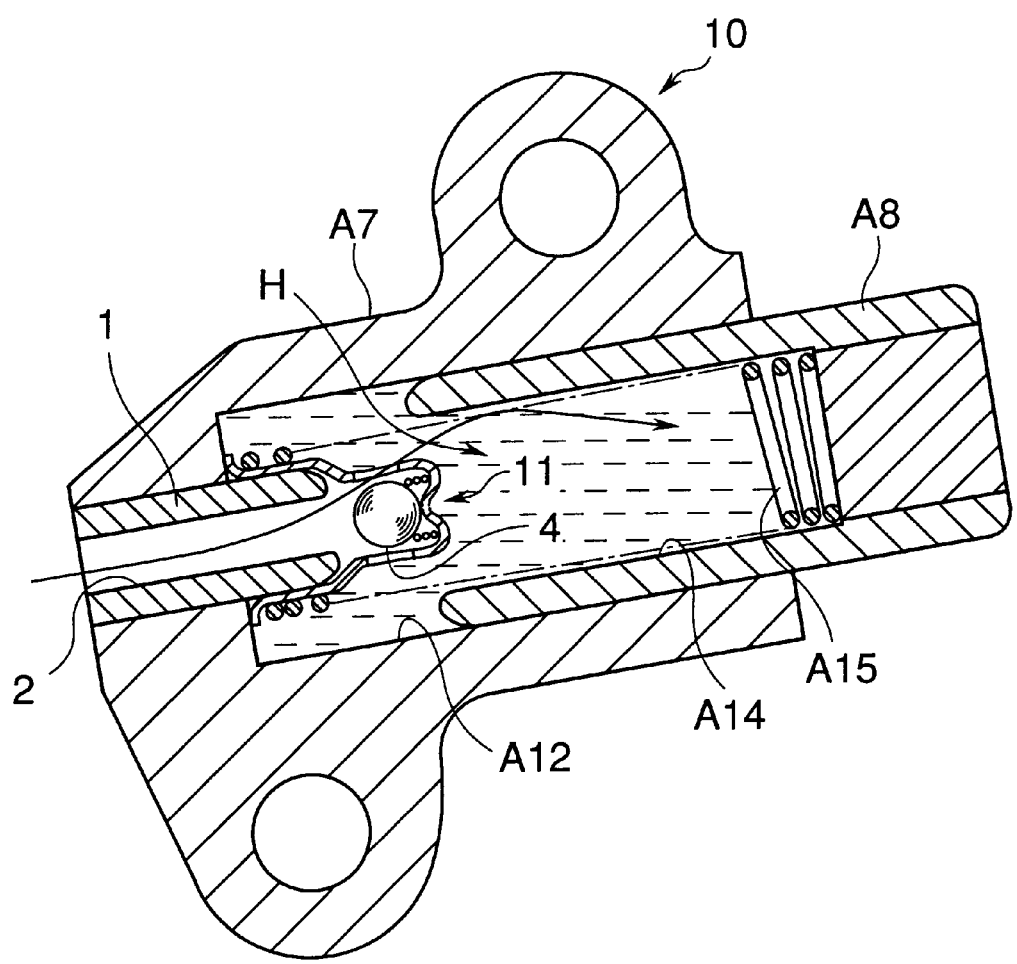
FIG. 1 is a cross-sectional view showing the general arrangement of a hydraulic tensioner according to the present invention.
Figure 5:
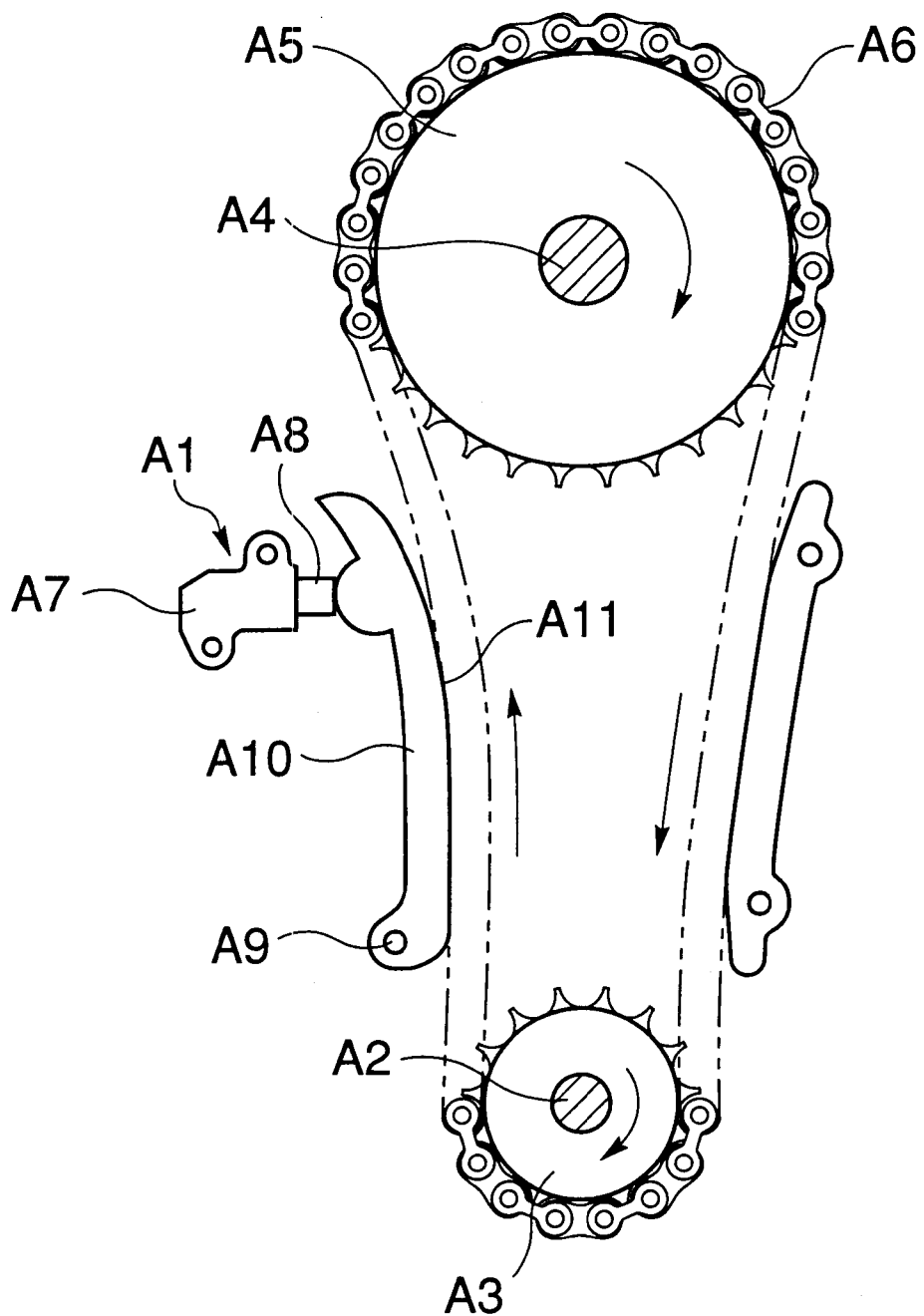
FIG. 5 is a diagrammatical view showing an example of use of a hydraulic tensioner.
Figure 6:
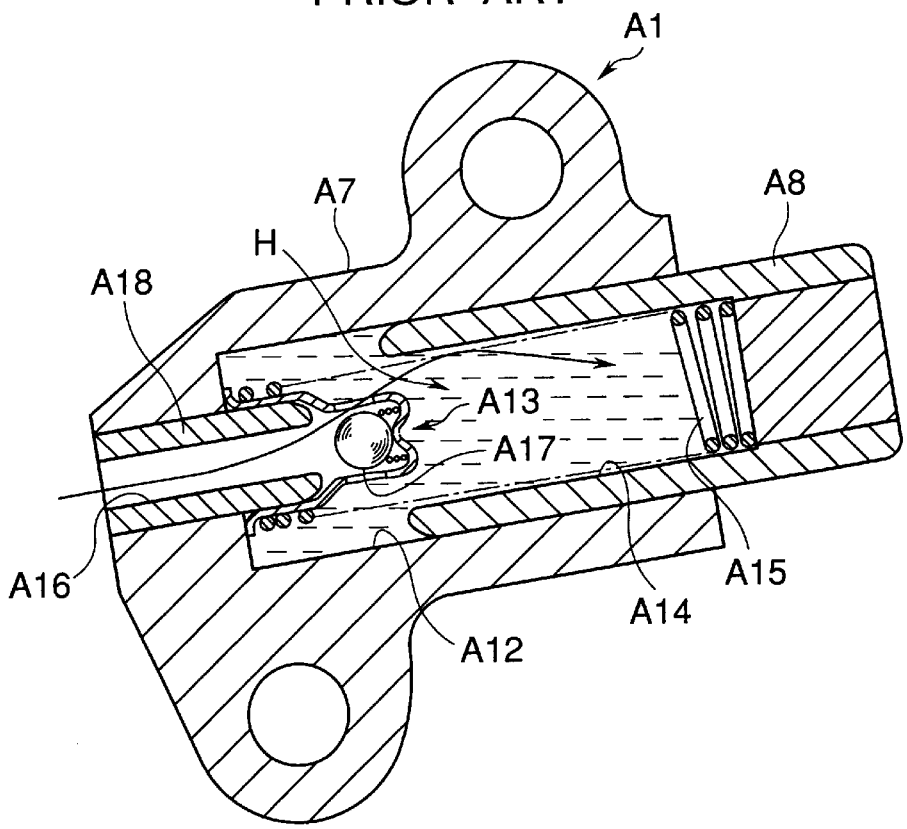
FIG. 6 is a cross-sectional view showing a conventional hydraulic tensioner.
Figure 7:
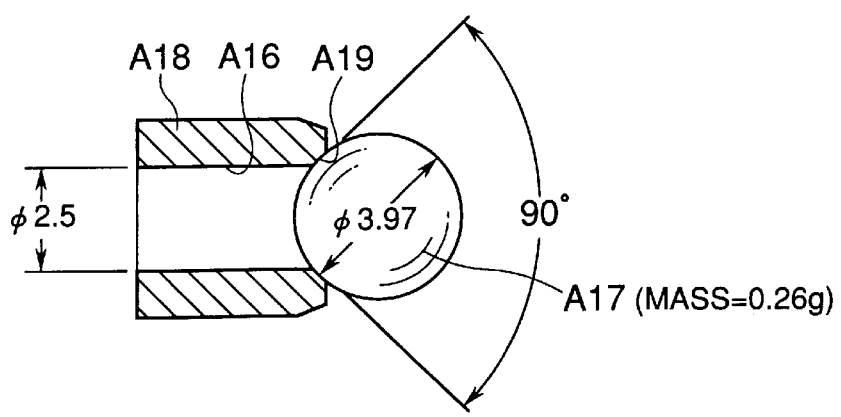
FIG. 7 is a view showing a part of FIG. 6 including a ball check valve of the conventional hydraulic tensioner.

Referring now to FIG. 1, there is shown a hydraulic tensioner 10 according to the present invention. The hydraulic tensioner 10 is substantially the same in construction as the conventional hydraulic tensioner described above with reference to FIGS. 5–7 with the exception that it includes a ball check valve 11 designed to overcome the problems associated with the conventional hydraulic tensioner. Due to the structural similarity, these parts which are the same as those shown in FIGS. 5–7 are designated by the same reference character.

The hydraulic tensioner 10 includes a tensioner body A7 having a plunger receiving hole A12. A plunger A8 is slidably fitted in the plunger receiving hole A12. A compression coil spring A15 is received in the plunger receiving hole A12 and acts between the tensioner body A7 and the plunger A8 to urge the plunger A8 in such a manner that one end of the plunger A8 projects outwards from said plunger receiving hole A12. The plunger A8 defines within the plunger receiving hole A12 a high-pressure chamber H.

The ball check valve 11 is provided at the bottom of the plunger receiving hole A12. The ball check valve 11 includes a hollow cylindrical valve seat 1, an oil passage 2 extending centrally and axially through the valve seat 1 and allows oil to be introduced into the high-pressure chamber H, and a check ball 4 disposed between the oil passage 2 and the high-pressure chamber H to permit only the flow of oil in one direction from the oil passage 2 toward the high-pressure chamber H. The check ball 4 rests on the valve seat 1 when the ball check valve 11 is closed.

Figure 2:
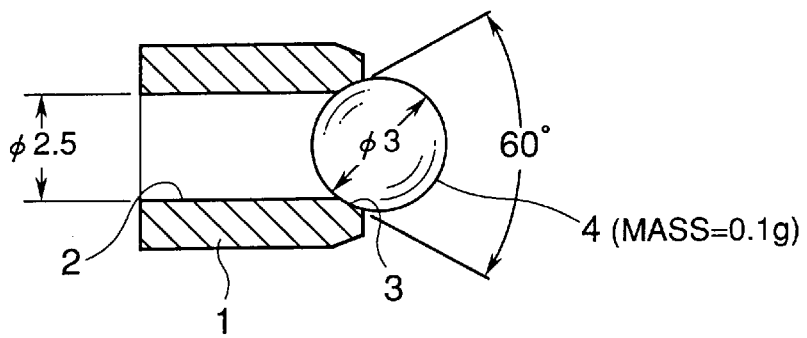
FIG. 2 is a view showing a portion of FIG. 1 including a ball check valve of the hydraulic tensioner.

As shown in FIG. 2, the oil passage 2 has an inside diameter of 2.5 mm. The ball seat 1 has a valve seating surface 3 facing the check ball 4. The valve seating surface 3 is formed by an outwardly diverging tapered seating surface having a divergent angle of 60° to 110°. In the illustrated embodiment, the divergent angle of the tapered seating surface is 60°. The check ball 4 is made of steel and has a diameter of 3 mm which is smaller than the diameter 3.97 mm of the conventional check ball A17 shown in FIGS. 6 and 7. The mass of the check ball 4 is reduced to 0.1 g.

The hydraulic tensioner 10 of the foregoing construction operates as follows.

When an impact force is exerted, due to a variation in tension of the chain (see the one A6 shown in FIG. 5), on the front end of the plunger A8 projecting from the tensioner body A7 and the plunger A8 is pushed suddenly in its retracting direction against the biasing force of the spring A15, the pressure of oil in the high-pressure chamber H rises and the check ball A19 of the ball check valve 11 is pushed against the valve seating surface 3 to block the flow of oil from the high-pressure chamber H toward the oil passage 2.

As a result, the oil present in the high-pressure chamber H leaks through a slight gap formed between the outer peripheral surface of the plunger A8 and the inner peripheral surface of the plunger receiving hole A12 and is discharged to the exterior, and the aforesaid impact force is buffered by the resulting flow resistance which is induced by the viscosity of oil. At the same time, the vibration of the plunger A8 caused by the impact force is damped quickly.

On the other hand, upon occurrence of an instantaneous slack on the tensioner side of the chain, for example, at the time of start-up of the engine, the plunger A8 will protrude from the tensioner body A7 in an instant by virtue of the spring A15 and follow up the displacement of the chain, thereby eliminating the slack.

At this time, the oil pressure in the high-pressure chamber H decreases, so the check ball 4 of the ball check valve 11 leaves the valve seating surface 3, allowing oil to be supplied into the high-pressure chamber H through the oil passage 2.

In the case where the force applied to the front end of the plunger A8 varies periodically, the internal oil pressure of the high-pressure chamber H also periodically varies accordingly.

In this connection, in the hydraulic tensioner 10 of the present invention, since the valve seating surface 3 of the ball seat 1 in the ball check valve 11 is formed as an outwardly diverging tapered surface having a divergent angle of 60° to 110°, and the mass of the check ball 4 is reduced to 0.1 g or less, the check ball 4 follows up variations in oil pressure of the high-pressure chamber H.

Figure 3:
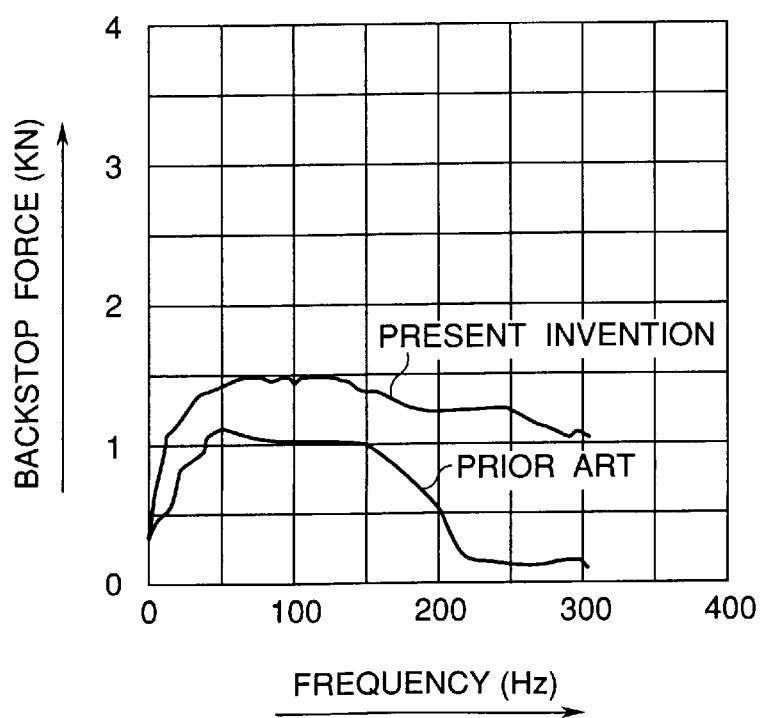
FIG. 3 is a graph showing results of a comparative test of backstop forces against loads applied periodically to plungers in both the hydraulic tensioner embodying the invention and a conventional hydraulic tensioner.

FIG. 3 is a graph showing results of a comparative test of backstop forces against loads applied periodically to plungers of the hydraulic tensioner 10 of the above embodiment and the conventional hydraulic tensioner of the structure shown in FIGS. 6 and 7. This comparative test was conducted at an oil pressure of 1 kg/cm2 fed to each hydraulic tensioner and at an oil temperature of 30° C.

As a result of the comparative test, as shown in FIG. 3, in a varying frequency range of 50 to 150 Hz of the load imposed on each plunger, there was obtained a backstop force of 1.5 N or so in the case of the hydraulic tensioner 10 of the present invention while the backstop force obtained in the conventional hydraulic tensioner was about 1N. Thus, it turned out that the backstop force was improved about 50% in the hydraulic tensioner 10 as compared with the conventional hydraulic tensioner.

Further, at varying frequencies exceeding 150 Hz of the loads imposed on the plungers, the backstop force in the conventional hydraulic tensioner drops rapidly, while the backstop force in the hydraulic tensioner of the invention drops little and still retained more than 1 N even at a varying frequency of its load exceeding 300 Hz.

Figure 4:
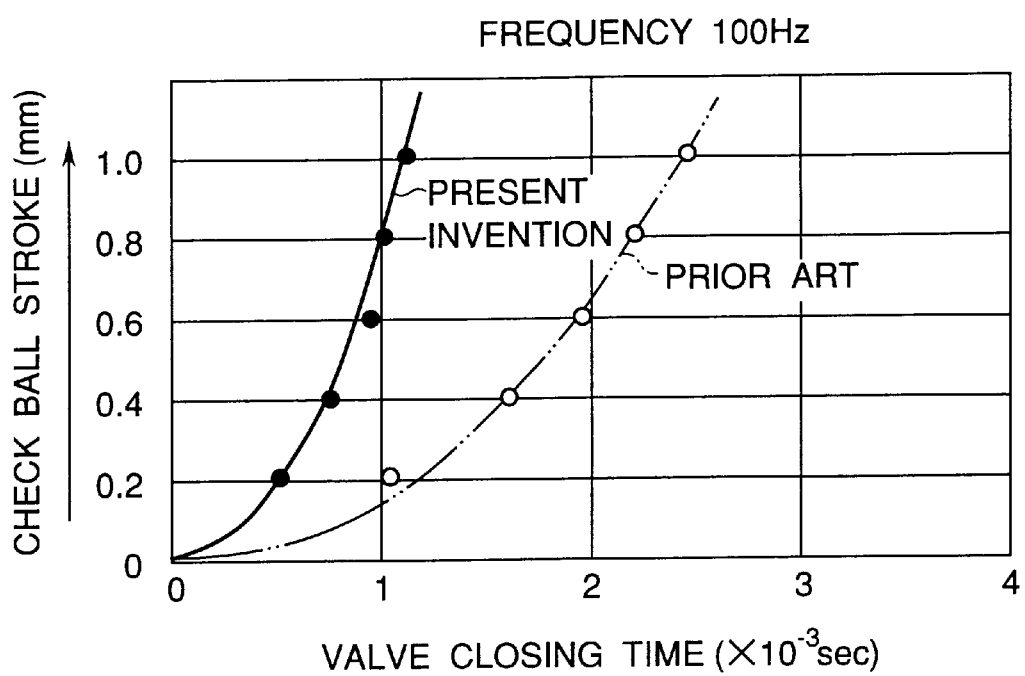
FIG. 4 is a graph comparing between the hydraulic tensioner embodying the invention and the conventional hydraulic tensioner with respect to a valve closing time under a load of 100 Hz frequency.

It is presumed that the drop of the backstop force is mainly dominated by the amount of oil flowing reverse to the oil passage side from the high-pressure chamber until closing of the valve by the check ball. FIG. 4 is a graph showing a relation between a valve closing time and a moving stroke of the check ball under a load applied periodically to the plunger at a frequency of 100 Hz in each of the hydraulic tensioner 10 of the present invention and the conventional hydraulic tensioner. As shown in FIG. 4, the valve closing time in the hydraulic tensioner 10 is half or less of that of the conventional hydraulic tensioner. Besides, this difference tends to become more significant as the stroke of the check ball becomes longer.

Although in the illustrated embodiment the divergent angle of the seating surface 3 of the ball seat 1 is set at 60° and the steel check ball 4 of 3 mm in diameter is used for the oil passage 2 of 2.5 mm in inside diameter which is a standard type, the material of the check ball is not limited to steel, but there may be used another material small in specific gravity and superior in abrasion resistance such as a ceramic material, a titanium alloy, or aluminum having a hard anodized surface. Moreover, insofar as the divergent angle of the seating surface of the ball seat is in the range of 60° to 110° and the mass of the check ball is 0.1 g or less, there can be obtained a sufficient backstop force.

If the divergent angle of the seating surface 3 of the ball seat 1 exceeds 110°, the contact between the seating surface 3 and the check ball 4 will become incomplete, and if it is smaller than 60°, the check ball 4 will be apt to bite into the seating surface 3 of the ball seat 1. Therefore, it is necessary to select an appropriate divergent angle within the range of 60° to 110° according to diameter of the check ball 4 and the inside diameter of the oil passage 2 which is open at the ball seating position.

In the present invention, as set forth above, the seating surface of the ball seat in the ball check valve is formed as an outwardly diverging tapered surface having a divergent angle of 60° to 110° and the mass of the check ball is set at 0.1 g or less. Accordingly, in comparison with the conventional hydraulic tensioner, the follow-up performance of the check ball for oil pressure variations of high frequencies is far superior and even in a region wherein the load acting on the plunger varies at high frequencies it is possible to ensure a sufficient backstop force without increasing the oil pressure supplied.

Consequently, particularly when the hydraulic tensioner of the present invention is applied to a timing chain in an engine of an automobile or the like, it is possible to prevent the occurrence of vibration and beat noise of the timing chain during high-speed running of the automobile and the performance required on the engine side can be satisfied to a satisfactory extent.

Obviously, various minor changes and modifications are possible in the light of the above teaching. It is to be understood that within the scope of the appended claim the present invention may be practiced otherwise than as specifically described.

What is claimed is:

1. A hydraulic tensioner comprising:

a tensioner body having a plunger receiving hole;

a plunger slidably fitted in said plunger receiving hole and urged by a spring so that one end of said plunger projects outwards from said plunger receiving hole, said plunger defining within said plunger receiving hole a high-pressure chamber; and a ball check valve having a hollow bore defining an oil passage allowing oil to be introduced into said high-pressure chamber, and a check ball disposed between said oil passage and said high-pressure chamber to permit the flow of oil only in a direction from said oil passage toward said high-pressure chamber;

said ball check valve hollow bore terminating in a valve seat, said check ball resting on said valve seat when the valve is closed, said oil passage extending through said valve seat, said valve seat having an outwardly diverging tapered seating surface having a divergent angle of at least 60° and less than 90°, said check ball having a mass of 0.1 g or less.

2. A hydraulic tensioner according to claim 1 wherein said hollow bore has an inside diameter and said ball has an outside diameter, said tapered seating surface having a small end with an inside diameter equal to the inside diameter of said hollow bore and a large end with an inside diameter equal to the outside diameter of said ball.

3. A hydraulic tensioner comprising:

a tensioner body having a plunger receiving hole;

a plunger slidably fitted in said plunger receiving hole and urged by a spring so that one end of said plunger projects outwards from said plunger receiving hole, said plunger defining within said plunger receiving hole a high-pressure chamber; and a ball check valve having a hollow bore defining an oil passage allowing oil to be introduced into said high-pressure chamber, and a check ball disposed between said oil passage and said high-pressure chamber to permit the flow of oil only in a direction from said oil passage toward said high-pressure chamber;

said ball check valve hollow bore terminating in a valve seat, said check ball resting on said valve seat when the valve is closed, said oil passage extending through said valve seat, said valve seat having an outwardly diverging tapered seating surface having a divergent angle of 60°, said check ball having a mass of 0.1 g or less.

* * * * *